United States Patent
Johns (10) Patent No.: US 8,467,208 B1
(45) Date of Patent: Jun. 18, 2013

(54) INPUT VOLTAGE-INDEPENDENT ACTIVE POWER CONTROL OF DC TO AC POWER CONVERTERS

(75) Inventor: David M. Johns, Groveleand, MA (US)

(73) Assignee: Excelitas Technologies Corp., Waltham, MA (US)

( * ) Notice: Subject to any disclaimer, the term of this patent is extended or adjusted under 35 U.S.C. 154(b) by 396 days.

(21) Appl. No.: 12/978,809

(22) Filed: Dec. 27, 2010

Related U.S. Application Data (63) Continuation-in-part of application No. 12/471,390, filed on May 24, 2009, now Pat. No. 7,859,872.

(51) Int. Cl.
*H02M 1/42* (2007.01)
*G05F 1/70* (2006.01)

(52) U.S. Cl.
USPC .................................. 363/89; 323/207

(58) Field of Classification Search
USPC ............... 363/79–81, 89; 323/205, 207, 222, 323/285, 351
See application file for complete search history.

(56) References Cited

U.S. PATENT DOCUMENTS

| | | | | |
|---|---|---|---|---|
| 5,006,975 A | * | 4/1991 | Neufeld | 363/80 |
| 5,329,217 A | * | 7/1994 | Kerkman et al. | 318/811 |
| 5,351,180 A | * | 9/1994 | Brennen et al. | 363/71 |
| 5,391,976 A | * | 2/1995 | Farrington et al. | 323/207 |
| 7,209,373 B2 | * | 4/2007 | Oicles et al. | 363/59 |
| 7,859,872 B1 | * | 12/2010 | Johns | 363/89 |
| 2011/0031943 A1 | * | 2/2011 | Green | 323/205 |

OTHER PUBLICATIONS

Yu Jin Song and Prasad N. Enjeti, "A High Frequency Link Direct DC-AC Converter for Residential Fuel Cell Power Systems," 2004 35th Annual IEEE Power Electronic Specialists Conference, Aachen, Germany, 2004, pp. 4755-4761, 2004.

* cited by examiner

*Primary Examiner* — Adolf Berhane
*Assistant Examiner* — Nusrat Quddus
(74) *Attorney, Agent, or Firm* — Peter A. Nieves; Sheehan Phinney Bass + Green PA

(57) ABSTRACT

The magnitude and wave shape of instantaneous alternating current and power delivered from a converter's single phase alternating current output is controlled by a closed loop power control scheme independent of the direct current input voltage to the converter. A fast averaging methodology for the value of control magnitude and wave shape of the instantaneous power delivered from the alternating current output can be used in the closed loop power control scheme to limit the magnitude of delivered power. The closed loop power control scheme can be used in both power grid-tied applications and stand-alone non-powered load line applications.

20 Claims, 8 Drawing Sheets

INPUT VOLTAGE-INDEPENDENT ACTIVE POWER CONTROL OF DC TO AC POWER CONVERTERS

CROSS REFERENCE TO RELATED APPLICATIONS

This application is a continuation-in-part of U.S. application Ser. No. 12/471,390 filed May 24, 2009, which is hereby incorporated by reference in its entirety.

FIELD OF THE INVENTION

The present invention relates generally to active output power control of single phase DC to AC converters and, in particular, to active output power control where the control method is independent of the converter's input voltage.

BACKGROUND OF THE INVENTION

In some DC to AC power conversion applications, one or more parameters of the DC input voltage to the converter is a required input variable to the converter's AC output power and power factor control process that can be implemented by hardware, software or a combination thereof. The DC input to the converter may be direct from the output of a DC power source or a DC link voltage. Consequently closed loop power control, and power factor control, is dependent upon the DC input voltage and inherent input voltage ripple. For example in a fuel cell power system, a fuel cell's DC output voltage that is inputted to a high frequency DC to AC converter can be used as the input to a proportional-integral-derivative controller that controls the converter's AC power quality output based on dynamic variations (ripple) in the fuel cell's DC output voltage as disclosed in the prior art (e.g., Yu Jin Song and Prasad N. Enjeti. "A High Frequency Link Direct DC-AC Converter for Residential Fuel Cell Power Systems," in *Proc. IEEE-PESC*, 2004, pp. 4755-4761).

Furthermore known pulse width modulated (PWM) power factor controllers do not limit instantaneous power in a linear manner. If the switched current exceeds an over current threshold, the PWM controller truncates the gate drive pulse width to instantly limit current and protect the power circuit. This discontinuous current limit boundary distorts the desired AC current, which increases the total harmonic distortion (THD) of the desired AC output current during such current limiting conditions.

Known DC to AC power converter controllers may use an average current mode control, or peak current mode control, of the power converter. These traditional methods require voltage feed-forward information from the DC input voltage as a control input to the power control circuit. Therefore, ripple voltage and other dynamic transients in the input voltage affect the quality of the current delivered to the load connected to the AC output of the converter. Consequently the frequency compensated error amplifier used in the controller is typically designed to prevent input voltage ripple from modulating the power control circuit, which would increase harmonic distortion.

It is one object of the present invention to provide closed loop power control and power factor control for a single phase DC to AC power converter that does not require feed-forward information from the DC input voltage to the converter.

It is another object of the present invention to provide controlled power conversion with up to exact unity power factor into AC line loads from DC sources and DC voltage links that may dynamically vary in voltage performance characteristics including magnitude.

It is another object of the present invention to provide a power factor control method that bounds both AC output current and AC output power as required by the state of the output AC line load in order to produce a robust system, with current and power defined, linearly controlled and linearly bounded even during AC swells (surges) or sags (dips) that can lead to excessive transient stresses on the power converter switching components.

It is another object of the present invention to provide a power factor control method that results in low total harmonic distortion during current limit mode operation by linearly bounding both AC output power and current, thereby preserving power quality even when the control circuit is in current limit mode.

BRIEF SUMMARY OF THE INVENTION

In one aspect, the present invention is an apparatus for, and method of, controlling the desired magnitude and wave shape of the instantaneous power delivered to a single phase AC line load from a power converter via a closed loop power control scheme.

In another aspect, the present invention is an apparatus for, and method of, active control of the power factor of the instantaneous power delivered to a single phase AC line load from a power converter via a closed loop power control scheme.

In another aspect, the present invention is an apparatus for, and method of, controlling the desired magnitude and wave shape of the instantaneous power delivered to a single phase AC line load from a power converter via a closed loop power control circuit utilizing a fast average value of the desired magnitude and wave shape of the instantaneous output power and a selected (control) maximum average output power value to constrain the closed loop power control circuit to the selected maximum average output power value.

In another aspect, the present invention is an apparatus for, and method of, controlling the desired magnitude and wave shape of the instantaneous power delivered to a single phase AC line load from a power converter via a closed loop power control circuit, by utilizing a maximum RMS output current (control) value to constrain the closed loop power control circuit to the selected maximum RMS current value.

In another aspect, the present invention is an apparatus for, and method of, controlling the desired magnitude and wave shape of the instantaneous power delivered to a single phase AC line load from a power converter via a closed loop power control circuit utilizing a maximum RMS output current (control) value, a fast average value of the desired instantaneous output power, and a selected (control) maximum average output power value to constrain the closed loop power control circuit to the selected maximum average input power value.

In another aspect, the present invention is an apparatus for, and method of, controlling the desired magnitude and wave shape of the instantaneous power delivered to a single phase AC line load without pre-existing AC voltage on the AC line from a power converter via a closed loop voltage and power control circuit utilizing a selected combination of a desired (control) program voltage waveform, a maximum RMS output current value, a fast average value of the desired instantaneous output power, and a selected maximum average output power value to constrain the closed loop power control circuit to the selected maximum average output power value.

The above and other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
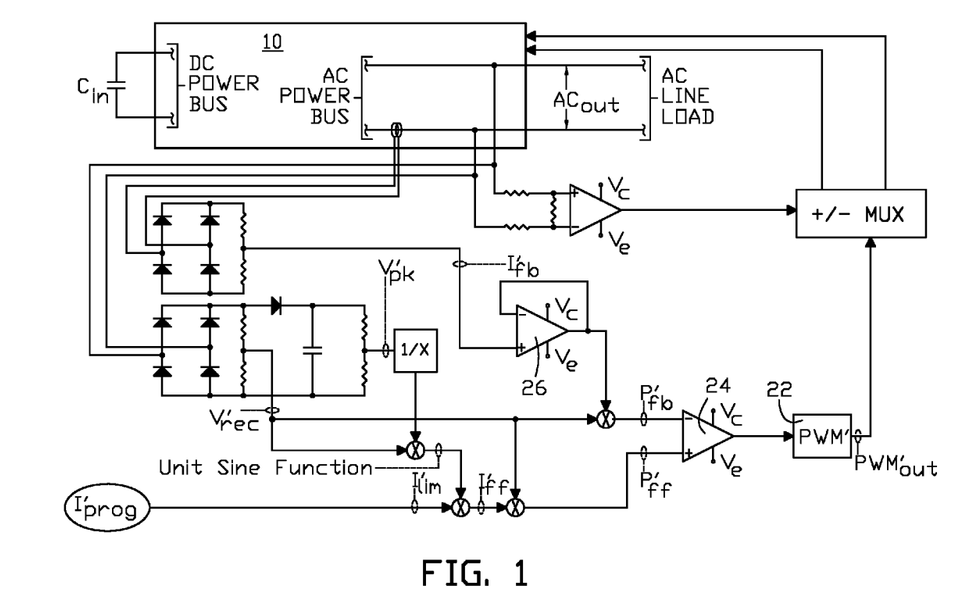
FIG. 1 is a simplified schematic diagram of one example of the active power control apparatus and method of the present invention.
Figure 2:
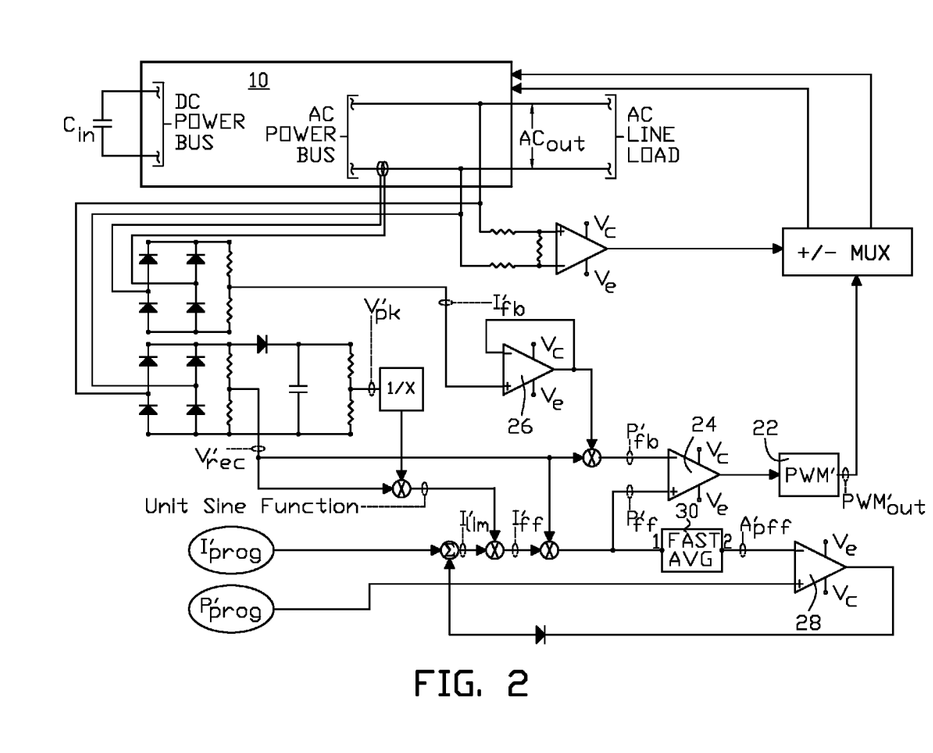
FIG. 2 is a simplified schematic diagram of another example of the active power control apparatus and method of the present invention.

There is shown in FIG. 1 and FIG. 2 typical examples of circuits that can be used for the input voltage-independent active converter power control of the present invention. The term "converter" also encompasses the term "inverter" which is sometimes used to describe direct current-to-alternating current (DC to AC) conversion apparatus. In these figures DC to AC power converter 10 is diagrammatically illustrated as a black box with input power supplied from a DC input, which is, by way of example and not limitation, illustrated as a charged capacitive element $C_{in}$ that may represent a DC link voltage. The DC input may alternatively be direct from a DC source that is either a conventional or unstable DC source such as the output from a single solar cell, or multiple solar cells arranged as photovoltaic modules or arrays. AC output from the converter, $AC_{out}$, is connected directly to an AC power line (or bus) to which power is delivered to one or more AC loads. Collectively the AC power line and loads are referred to as the "AC LINE LOAD." The DC input is connected to the converter's DC POWER BUS, and a plurality of converter switching devices are suitably arranged between the inverter's DC POWER BUS and AC POWER BUS, which is connected to the AC output. DC to AC power converter 10 may be of any suitable design as described in the art. If the converter is of a PWM design, suitable PWM controlled power converter topologies include, but are not limited to buck, boost, flyback, or combinations thereof. The conventional PWM gate drive control can be multiplexed to control the converter switching devices as selected and arranged for a particular application to generate an AC output on the AC POWER BUS to the AC output.

Signals and parameters designated in the figures are as described in the following table and this specification.

| Drawing symbol | Signal nomenclature | Signal description |
|---|---|---|
| $V'_{rec}$ | Rectified Output Voltage Feedback | Scaled and rectified voltage signal that represents the instantaneous absolute value of the converter's output AC voltage. |
| $V'_{pk}$ | Peak Output Voltage | DC voltage value that represents the peak magnitude of the rectified converter's output AC voltage. |
| $I'_{prog}$ | Programmed Output Current | DC voltage value proportional to a selected (control) level of maximum RMS current delivered to the AC LINE LOAD from the converter. |
| $P'_{prog}$ | Programmed Output Power | DC voltage value proportional to a selected (control) maximum average output power value delivered to the AC LINE LOAD from the converter. |
| $I'_{ff}$ | Feed Forward Current | Dynamic DC voltage value representing the desired (control) magnitude and wave shape of the instantaneous converter output current. |
| $P'_{ff}$ | Feed Forward Power | Dynamic DC voltage value representing the desired (control) magnitude and wave shape of the instantaneous power delivered by the converter to the AC LINE LOAD. |
| $A'_{pff}$ | Average Feed Forward Power | DC voltage value representing a "fast average" value of the Feed Forward Power signal, which can be derived from an analog, digital or combination of an analog and digital computation as further described below. |
| $I'_{fb}$ | Feedback Current | Dynamic DC voltage value representing the instantaneous current in the converter's power circuit (AC POWER BUS). |
| $P'_{fb}$ | Feedback Power | Dynamic DC voltage value representing the instantaneous power delivered by the converter to the AC LINE LOAD. |
| $I'_{lim}$ | Limit Current | DC voltage value proportional to the instantaneous, real-time RMS current as may be determined by alternative methods described below. |
| $V^*_{prog}$ | Programmed Output Voltage | Full wave rectified sine voltage waveform proportional in magnitude, frequency, and phase to a selected (control) instantaneous voltage output waveform delivered to the AC LINE LOAD. |

$I'_{prog}$ and $P'_{prog}$ (if used in a particular application) may be internally, or externally, selected or programmed values. For example, internally the selected value may be fixed by selected circuit components, or a constant value stored in a suitable computer memory device that can be accessed by a processing device executing a software program that controls power converter 10 via suitable input and output hardware interfaces. Externally the selected value may be variably inputted from a control device such as a voltage potentiometer or some other control circuit. For example the control circuit may be designed to maximize utilization of power from an unstable renewable energy source, as in a photovoltaic application, where the externally selected value may be the output voltage from a control circuit executing a "maximum power point" algorithm.

The value of the Feed Forward Current ($I'_{ff}$) signal can be calculated from the following equation:

$$I'_{ff} = I'_{lim} * \left[\frac{V'_{rec}}{V'_{pk}}\right]$$

(equation 1) as schematically represented in FIG. 1 or FIG. 2.

The value of the Feed Forward Power ($P'_{ff}$) signal can be calculated from the following equation:

$P'_{ff}=I'_{ff}*V'_{rec}$ (equation 2) as schematically represented in FIG. 1 or FIG. 2.

The value of the Feedback Power ($P'_{fb}$) signal can be calculated from the following equation:

$P'_{fb}=I'_{fb}*V'_{rec}$ (equation 3) as schematically represented in FIG. 1 or FIG. 2 with the Feedback Current ($I'_{fb}$) optionally conditioned by buffer amplifier 26. The current transformer, rectifier circuit and buffer amplifier (if used) as shown in the figures for the Feedback Current circuit may be referred to as the current sensing circuit.

As illustrated in FIG. 1 or FIG. 2 one example of a closed loop power control circuit utilized in the present invention comprises PWM controller 22 (PWM') and frequency compensated error amplifier 24. PWM controller 22 outputs a gate drive signal (PWM'$_{out}$) to a multiplexer which steers the PWM gate drive signal to the converter switching devices as appropriate for the instantaneous polarity of the AC LINE LOAD. The gate drive signal is proportional in outputted pulse width to the output of frequency compensated error amplifier 24. Inputs to error amplifier 24 are the Feedback Power and Feed Forward Power signals as described above. The closed loop power control circuit forces the instantaneous power output from the converter to follow the desired control Feed Forward Power signal in magnitude and wave shape. Amplifier 24 follows the dynamic instantaneous Power Feed Forward signal with high bandwidth fidelity, which provides the power converter with high bandwidth, fast transient response. More generally amplifier 24 may be any circuit that compares the value of the Feed Forward Power signal to the value of the Feedback Power signal to output a delta output power signal equal to the difference between the Feed Forward and Feedback Power signals. More generally PWM controller 22 may be any device that outputs a control signal (such as a gating signal) proportional to the delta output power signal for controlling the converter switching devices utilized in a particular converter application.

By satisfying the instantaneous Feed Forward Power command signal, the AC LINE LOAD output current from the converter follows in-phase with the AC LINE LOAD voltage to provide unity power factor to the AC LINE LOAD. The high bandwidth fidelity of power error amplifier 24 allows the converter to achieve exact unity power factor with low (for example, less than 2.5 percent) total harmonic distortion with no sensitivity to variations in the DC input voltage, so long as the voltage remains within the operational bounds required by the design of the DC to AC power converter.

If the AC LINE LOAD voltage root mean square (RMS) value fluctuates, the converter current output will also fluctuate with inverse proportionality in order to follow the value of the Feed Forward Power signal resulting in closed loop power control. Consequently the system parameter enclosed by the control loop is the power of the converter system, and not voltage or current as in the prior art.

As described above and shown schematically in the figures, the Limit Current ($I'_{lim}$) signal is a DC value proportional to the instantaneous RMS output current from the converter. The Limit Current signal is scaled by $\sqrt{2}$ to match the peak value of the sine wave of a desired control RMS value since $$I_{RMS} = \frac{I_{peak}}{\sqrt{2}}.$$

A rectified Unit Sine Function signal is artificially created by dividing the rectified converter AC output voltage sine signal by its peak value $$\left(\frac{V'_{rec}}{V'_{pk}}\right)$$

as schematically represented in the figures. This signal has a magnitude of unity and a wave shape that is proportional to, and in phase with, the rectified AC LINE LOAD voltage. The value of the rectified Unit Sine Function signal is multiplied by the value of the Limit Current ($I'_{lim}$) signal in order to create the Feed Forward Current ($I'_{ff}$) signal, as schematically represented in the figures. By mathematical definition, and as implemented in the present invention, if the AC current outputted from the converter follows the Feed Forward Current signal, exact unity power factor will be achieved.

Preferably in some examples of the invention, the DC value of the Limit Current ($I'_{lim}$) signal as shown in FIG. 1 may be modified, for example, as shown in FIG. 2. The maximum value of $I'_{lim}$ is typically equal to the Programmed Output Current ($I'_{prog}$) value as shown in FIG. 1. But the resulting mathematical product of $I'_{ff}$ (when $I'_{lim}$ is equal to $I'_{prog}$) and $V'_{rec}$ may result in a Feed Forward Power value in excess of the desired power control limit. In order to constrain the power control so that the desired power output is not exceeded, the Average Feed Forward Power ($A'_{pff}$) signal and the Programmed Output Power ($P'_{prog}$) signal are provided as inputs to frequency compensated error amplifier 28 as shown in FIG. 2. The output of amplifier 28 reduces (and only reduces) the value of $I'_{lim}$. $I'_{prog}$ need not change, but $I'_{lim}$ is made a variable DC signal since $I'_{lim}$ is the sum of $I'_{prog}$ and the output of amplifier 28. Therefore the value of $I'_{lim}$ is dynamically modified in order to force the controller to obey the desired control power limit as illustrated in the example of the invention shown in FIG. 2.

Figure 4A:
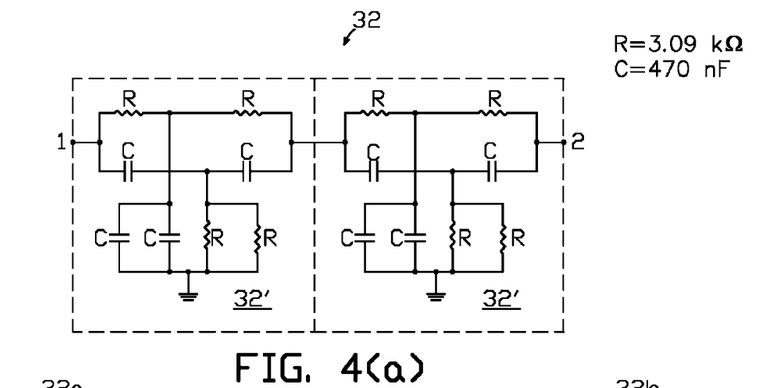
FIG. 4(a) illustrates one example of a fast averaging circuit used to determine a fast average value of a sinusoidal waveform and utilized in some examples of the active power control apparatus and method of the present invention.
Figure 5A:
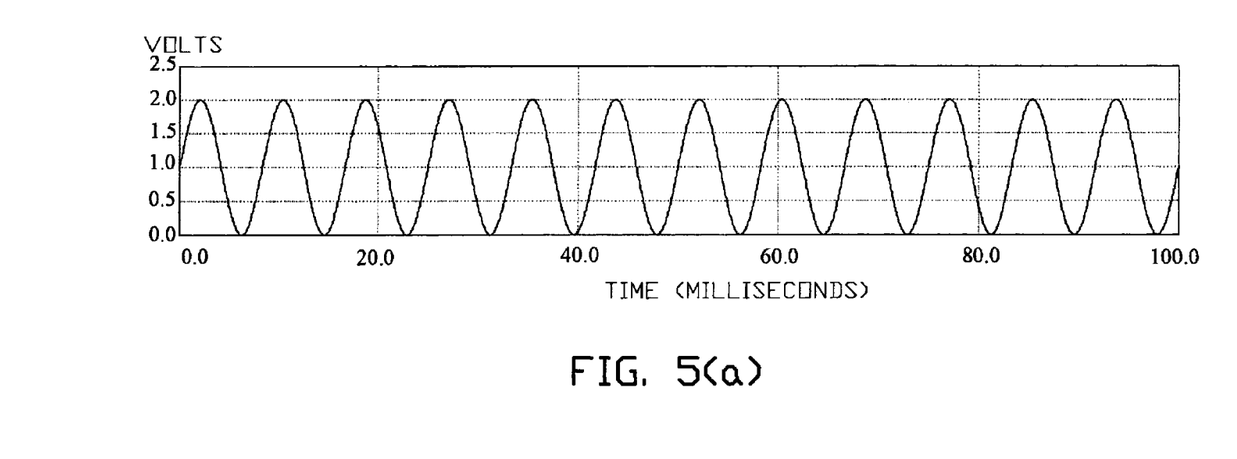
FIG. 5(a) graphically illustrates a sinusoidal waveform inputted to the filter network shown in FIG. 4(a) with the filter network's DC output voltage response illustrated in FIG. 5(b).
Figure 5B:
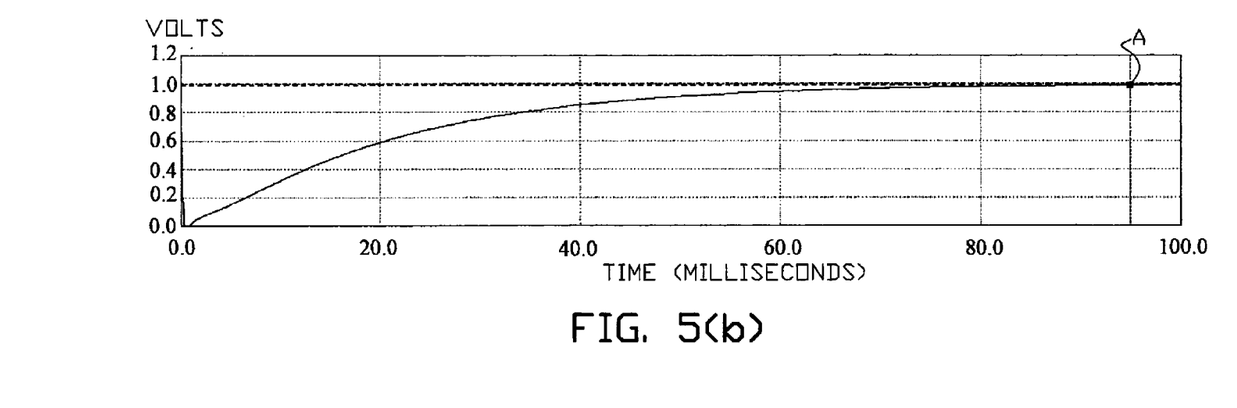

FIG. 4(a) illustrates one analog "fast averaging" circuit (FAST AVG) 30 (in FIG. 2) that can be used to obtain a "fast average" dynamic DC voltage value for the Average Feed Forward Power signal. The fast averaging circuit in FIG. 4(a) comprises filter network 32. Filter network 32 comprises a pair of notch filters 32' connected in cascade with $\omega_0=(1/R*C)$ and attenuation of minus 60 db at $\omega_0$ plus/minus 10 percent. FIG. 5(a) illustrates a Power Feed Forward signal input (at terminal 1) to filter network 32 in FIG. 4(a) and FIG. 5(b) illustrates the DC output (at terminal 2) response from the filter network, which is the Average Feed Forward Power signal. As shown in FIG. 5(b) the Average Feed Forward Power signal value converges to approximately 99 percent of the average value of 1.0 in about 95 milliseconds at point "A." Typical but non-limiting circuit values for circuit elements in the filter network are illustrated in FIG. 4(a).

Figure 4B:
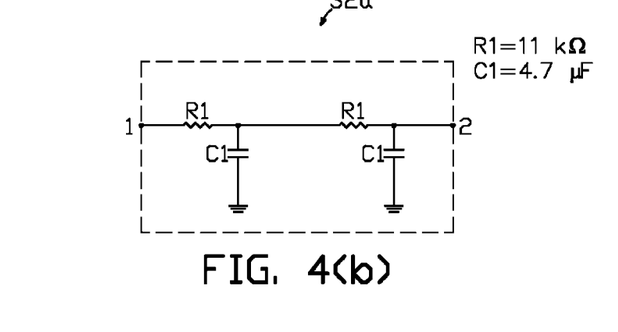
FIG. 4(b) and FIG. 4(c) are comparative filter designs used to illustrate the advantage of the fast average filter network shown in FIG. 4(a).
Figure 4C:
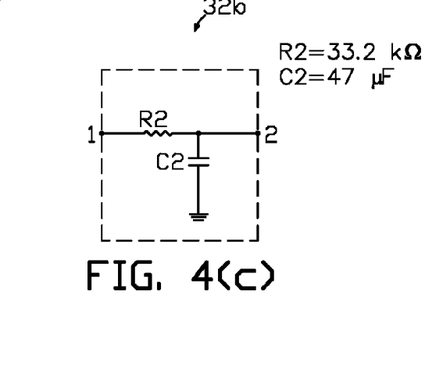

Filter network 32 can be utilized as a fast averaging circuit in any application, beyond the present application, where there is a requirement to quickly determine a DC voltage value that represents the average value of a sinusoidal waveform. The comparative advantage of the filter network shown in FIG. 4(a) for use as a fast averaging circuit is illustrated by comparison with the DC responses of the double pole low pass filter network 32a in FIG. 4(b) and single pole low pass filter 32b in FIG. 4(c). Typical values for circuit elements in the filters are illustrated in FIG. 4(b) and FIG. 4(c).

Figure 6A:
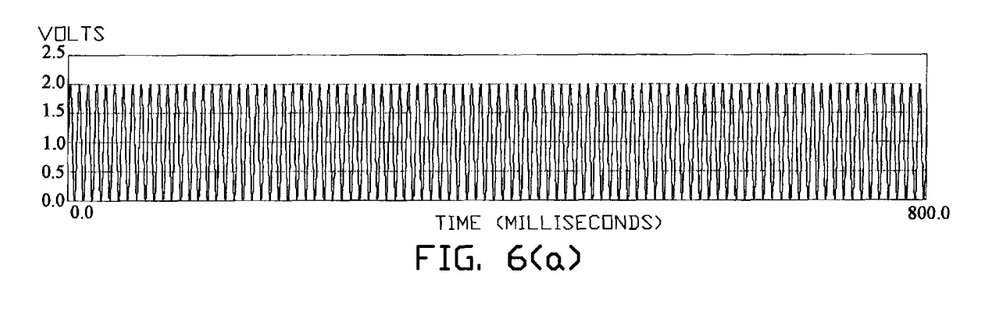
FIG. 6(a) graphically illustrates a sinusoidal waveform inputted to the filter network shown in FIG. 4(b) with the filter network's DC output voltage response illustrated in FIG. 6(b).
Figure 6B:
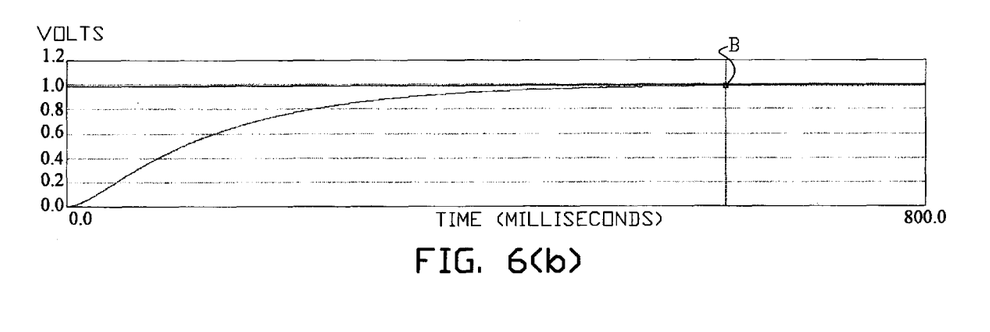
Figure 7:
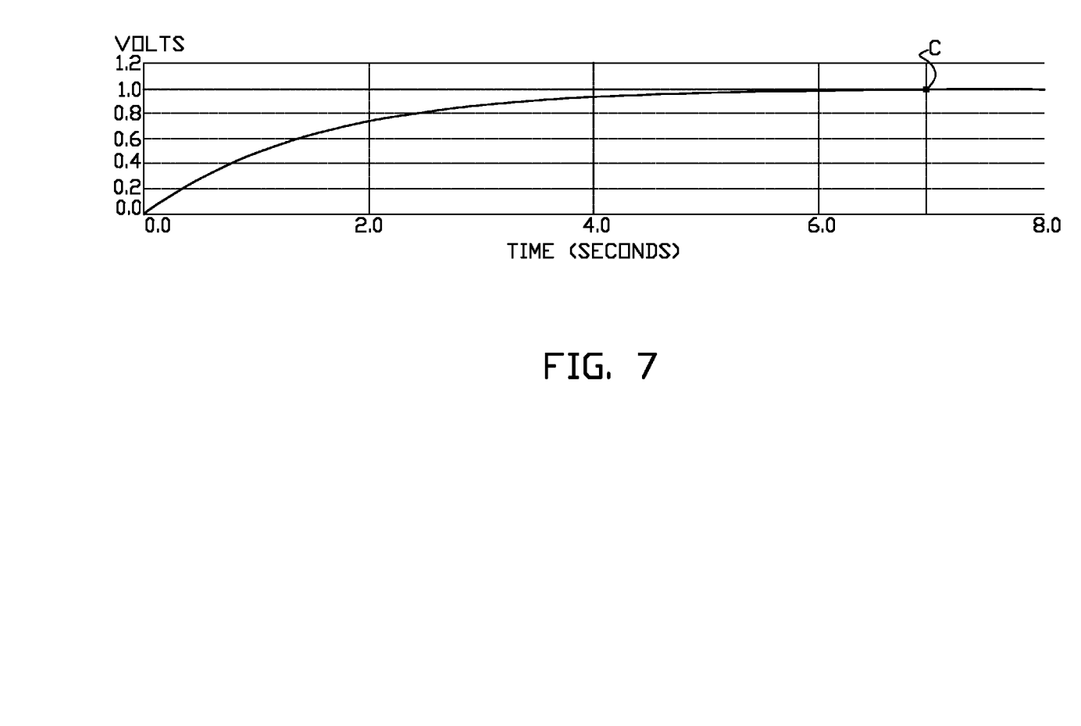
FIG. 7 graphically illustrates the DC output voltage response from the filter shown in FIG. 4(c) with the sinusoidal input shown in FIG. 5(a) or FIG. 6(a).

As illustrated in FIG. 6(a) and FIG. 6(b) for the double pole low pass filter network with $\omega_{0,1}=(1/R1*C1)$ and attenuation of minus 60 db at $\omega_0$ minus 10 percent, with the input signal in FIG. 6(a), which is the same as the input signal in FIG. 5(a), the DC output response shown in FIG. 6(b) converges to approximately 99 percent of the average value of 1.0 in approximately 614 milliseconds at point "B." As illustrated in FIG. 7 for the single pole low pass filter with $\omega_{0,2}=(1/R2*C2)$ and attenuation of minus 60 db at $\omega_0$ minus 10 percent, for the same input signal shown in FIG. 5(a) or FIG. 6(a), the DC output response converges to approximately 99 percent of the average value of 1.0 in approximately 7.0 seconds at point "C."

While the fast averaging circuit illustrated in FIG. 4(a) is analog, a digital, or combination analog and digital fast averaging circuit may be utilized in some examples of the invention.

The overall result of this servo loop inside the control path is that the power supply controller may seamlessly cross over in a linear manner between maximum current limit mode and power limit mode in response to varying AC LINE LOAD voltages, or in robust response to perturbations in the RMS AC LINE LOAD voltage, or in fast dynamic response to power conversion capabilities of the DC input. Power and current are both actively bounded and linearly controlled by this control scheme. Power quality is preserved through abnormal events, and potential fault modes are avoided by remaining within the designed control boundaries.

This control approach can be made very robust against input power and AC LINE LOAD voltage transients due to the flexibility provided by the various state control signals inherent in the method of the present invention. Power conversion control can be modified by automatic limiting of the maximum value of $P'_{prog}$ as required or permitted by the DC input. In one example of the present invention, an unstable DC source, such as the output of one or more interconnected photovoltaic cells, or one or more wind turbines (generators), can have their collective DC outputs connected across capacitive element $C_{in}$ (serving as a DC link) at the input to DC to AC converter 10 shown in FIG. 1 or FIG. 2. The connection to the DC link may either be direct from the DC outputs of the photovoltaic cells or wind turbines, or indirect via a conventional power conditioner or converter, and the control system of the present invention can be used to dynamically provide AC power as required, or permitted, from the variable voltage DC link without degradation of the AC output power factor or THD. The present invention provides various features required to bound and maintain linear control over both instantaneous power and current in response to both input and output voltage changes. High power transients and high current transients are thereby inherently avoided by the proper design of the control boundaries.

The method of power conversion control of the present invention may be utilized in various applications. For example the present invention may be utilized in renewable energy power conversion applications as described above. The present invention may also be utilized in micro combined heat and power (micro-CHP) systems where an engine (internal combustion; Sterling; steam or microturbine) is coupled to a DC generator to generate electricity and heat (as a byproduct). The apparatus and method of the present invention may be used to convert the output of the micro-CHP DC generator to AC power.

The applications described in the two previous paragraphs are representative of applications where a relatively stable DC input voltage is typically required and one or more of the DC input voltage parameters are required in the prior art to process and convert the input power to an AC power output having a high power factor (for example, greater than 0.9) and low THD (for example, less than 2.5 percent).

Figure 3A:
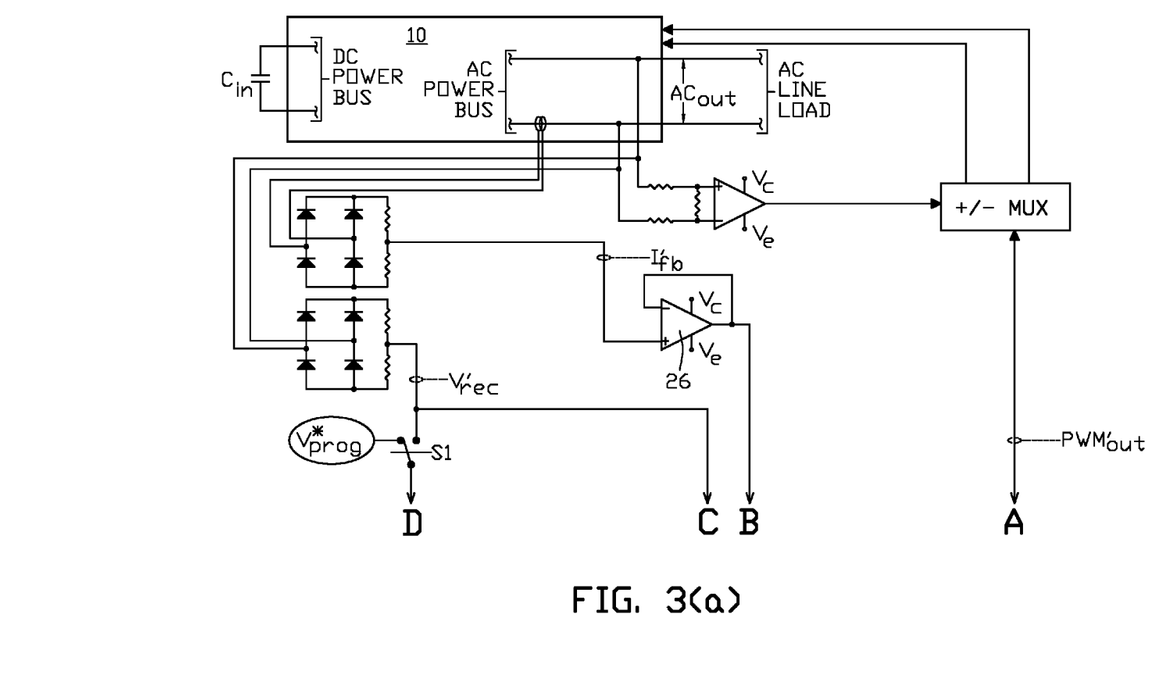
FIG. 3(a) and FIG. 3(b) are a simplified schematic diagram of another example of the active power control apparatus and method of the present invention wherein letters A, B, C and D are used to indicate circuit connections between FIG. 3(a) and FIG. 3(b).
Figure 3B:
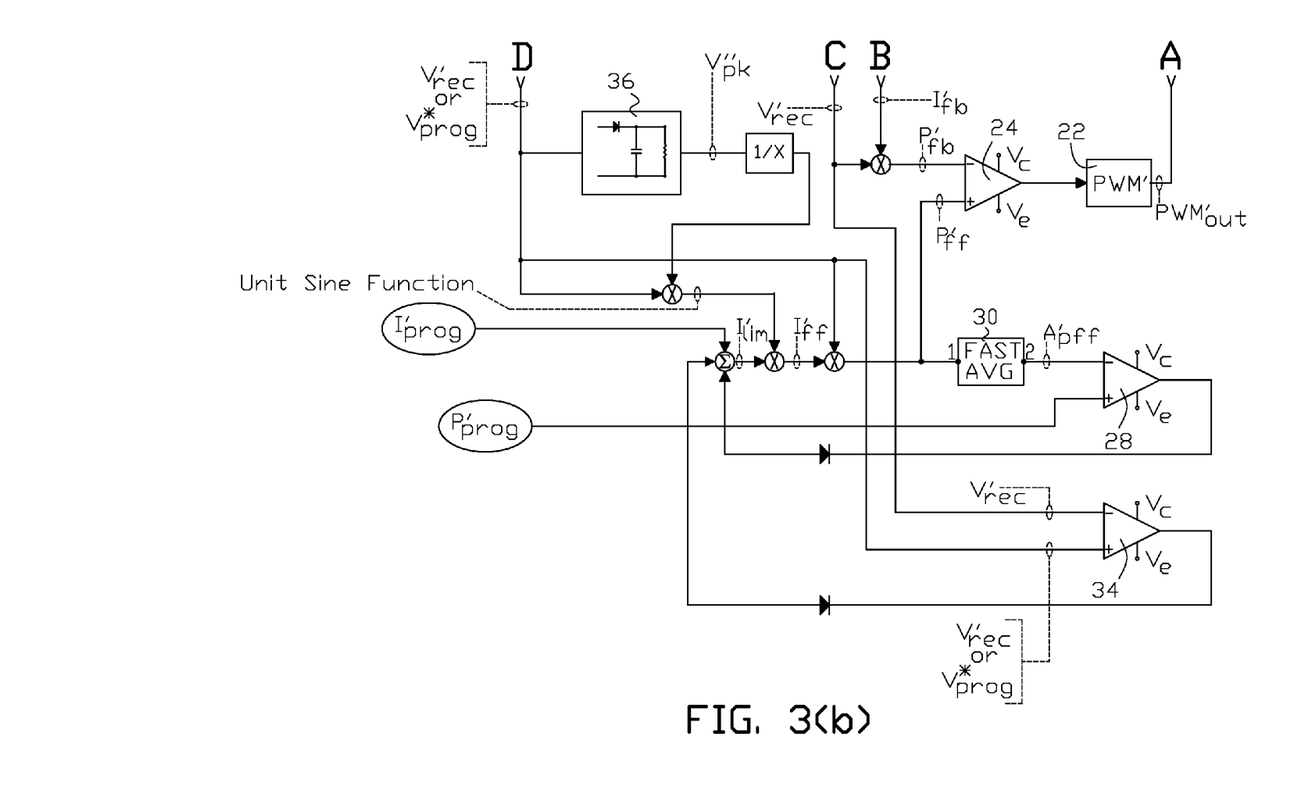

The above examples of the invention can be utilized in gird-tied converter (inverter) applications. FIG. 3(a) and FIG. 3(b) illustrate one example of the input voltage-independent active converter power control of the present invention that can be utilized in grid-tied converter applications, or as a stand-alone DC to AC converter, where the AC output of the converter (connected to AC LINE LOAD) is not an AC grid that is energized independent from the AC output of the converter. That is, when the output of converter 10 is connected to an AC line load (or an AC grid) that is powered solely from the output of the converter, the converter operates in an "independently powered mode" or "stand-alone mode." When the output of converter 10 is connected to an AC line load (or an AC grid) that is powered from one or more sources independent from the power output of the converter, the converter operates in a "grid-tied mode." An AC line load (or AC grid) may operate alternatively (or optionally) in the stand-alone mode and grid-tied modes at different times, for example, when power to the grid from the one or more converter-independent sources (operating in grid-tied mode) is lost so that the converter operates in the stand-alone mode.

In the above example of the invention illustrated in FIG. 2, Rectified Output Voltage Feedback signal $V'_{rec}$ provides a "feed forward" signal (for Feed Forward Current $I'_{ff}$ and Feed Forward Power $P'_{ff}$) and a feedback signal (for Feedback Power $P'_{fb}$). In the example of the invention illustrated in FIG. 3(a) and FIG. 3(b) switch 51 provides separation of the "feed forward" signal from the feedback signal for a stand-alone DC to AC converter or an Uninterruptible Power Supply (UPS) application where a "feed forward" voltage reference waveform is required in the absence of an energized AC grid to which the AC LINE LOAD is connected. $V*_{prog}$ can be a rectified full wave sine signal with the magnitude, frequency and phase of the desired AC output voltage from the converter. $V*_{prog}$ may be internally, or externally, selected or programmed. For example, internally the selected waveform may be fixed by selected circuit components, or a waveform sourced from a suitable computer memory device that can be accessed by a processing device executing a software program that controls power converter 10 via suitable input and output hardware interfaces. Externally the selected waveform may be variably inputted from a control device such as a function generator or some other control circuit.

With switch S1 positioned as shown in FIG. 3(a) (that is, connected to $V*_{prog}$ and not connected to $V'_{rec}$), which is the stand-alone mode, the Unit Sine Function signal, the Feed Forward Current signal ($I'_{ff}$) and the Feed Forward Power signal ($P'_{ff}$) are all derived from the Programmed Output Voltage signal ($V*_{prog}$). In the stand-alone mode, the Rectified Output Voltage Feedback signal ($V'_{rec}$) only provides a feedback signal. Compensated error amplifier 34 in FIG. 3(b) throttles the Feed Forward Current signal ($I'_{ff}$) in order to control the converter AC output voltage as a function of impedance that appears across the AC LINE LOAD by reducing the Limit Current ($I'_{lim}$) by the difference voltage value outputted from the frequency compensated error amplifier 34. The result of this control method is that the converter AC output voltage will follow the instantaneous magnitude, frequency and phase of the Programmed Output Voltage signal ($V*_{prog}$), with polarity controlled by multiplexer "+/−MUX," unless the impedance across the AC LINE LOAD has decreased to a value equal to the Programmed Output Power signal ($P'_{prog}$), if used, or the Programmed Output Current signal ($I'_{prog}$), at which point the converter AC output voltage will begin to sag as a function of the AC LINE LOAD impedance. The Programmed Output Power and Programmed Output Current limits are inviolable boundary conditions in the stand-alone mode (or UPS applications) as it is in the grid-tied applications described above.

Signals and circuits in FIG. 3(a) and FIG. 3(b) common to signals and circuits disclosed in FIG. 1 or FIG. 2 are understood according to the disclosure provided above for the examples of the invention shown in FIG. 1 and FIG. 2. In FIG. 3(b) peak detect and hold circuit 36 is diagrammatically represented, and may be any suitable peak detect and hold circuit known in the art, with $V''_{pk}$ being the peak value of either signal $V'_{rec}$ or $V^*_{prog}$ depending upon the position of stand-alone/grid-tied select switch S1.

In the stand-alone mode, the stand-alone Limit Current $I'_{lim}$ may be selectively the sum of one or more of three signals, namely Programmed Output Current $I'_{prog}$; the output of compensated error amplifier 34; and the output of compensated error amplified 28. In one embodiment of the invention, the stand-alone limit current is the sum of the Programmed Output Current and the output of error amplifier 34 as further described above. In another embodiment of the invention, the stand-alone limit current is the sum of all three signals as diagrammatically shown in FIG. 3(b).

The closed loop power control scheme of the present invention provides fast dynamic control response. The proposed topology is a real-time power factor controller which is independent of input voltage feed-forward. Compensated error amplifier 24, which drives the PWM gate drive of the converter switching devices has a settling time significantly shorter than one line cycle. A suitable device selection for the error amplifier is type TLC082 (Texas Instruments Inc., Dallas, Tex.). Power feedback is controlled to follow the Power Feed Forward signal. Therefore, closed loop power factor control is maintained with high bandwidth control regardless of input voltage ripple or output voltage transients. Due to the wide bandwidth of the method of the present invention, exact unity power factor is maintained even during abnormal AC LINE LOAD quality transients where the AC voltage may be temporarily non-sinusoidal in grid-tied converter applications. Exact unity power factor and low THD (e.g., less than 2.5 percent) are also maintained during fast input voltage transients due to dynamic behavior of the DC input power.

The apparatus and method of the present invention may be implemented in analog, digital or a combination of analog and digital components and signals wherein an implementation may further comprise at least one computer processor executing at least one computer program in accordance with at least one of the methods of the present invention.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa. Circuit elements without values indicated in the drawings can be selected in accordance with known circuit design procedures.

The above examples of the invention have been provided merely for the purpose of explanation, and are not to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. A method of controlling the power output of a converter having a DC input connected to a converter DC power bus and a single phase AC output connected to a converter AC power bus, the single phase AC output controlled by a plurality of converter switching devices connected between the converter DC power bus and the converter AC power bus, the method comprising the steps of:
  generating a unipolar output voltage DC signal proportional to the instantaneous absolute value of an output voltage at the single phase AC output;
  generating an output peak voltage DC signal proportional to the peak value of the rectified voltage of the output voltage;
  generating a converter current signal proportional to the instantaneous magnitude of the AC current on the converter AC power bus;
  generating a unit sine function value from the product of the unipolar output voltage DC signal and the inverse of the output peak voltage DC signal;
  generating a feed forward current signal from the product of the unit sine function value and a limit current value;
  generating a feed forward power signal from the product of the feed forward current signal and the unipolar output voltage DC signal;
  generating a feedback power signal from the product of the unipolar output voltage DC signal and the converter current signal;
  comparing the feed forward power signal to the feedback power signal to determine a difference power value equal to the difference between the value of the feed forward power signal and the value of the feedback power signal;
  inputting the difference power value to a power conversion switch device controller; and
  outputting a control signal from the power conversion switch device controller to the plurality of converter switching devices, the control signal proportional to the difference power value.

2. The method of claim 1 wherein the power conversion switch device controller is a PWM controller and the control signal is a pulse width gating signal having a pulse width proportional to the difference power value.

3. The method of claim 1 wherein the limit current value is proportional to a control value of the maximum RMS current of an output current at the single phase AC output.

4. The method of claim 1 further comprising the steps of:
  generating a fast average feed forward power signal;
  comparing the value of the fast average feed forward power signal with the value of a power reference signal proportional to a control value of the maximum average power supplied to the single phase AC input to determine a difference fast power value equal to the difference between the value of the fast average feed forward power signal and the value of the power reference signal; and
  determining the limit current value from the sum of the difference fast power value and a control value of the maximum RMS current of an output current at the single phase AC output.

5. The method of claim 4 wherein the step of generating the fast average feed forward power signal comprises the step of inputting the feed forward power signal to a cascaded pair of notch filters for output of the fast average feed forward power signal from the cascaded pair of notch filters.

6. A power control system for a power converter, the power converter having a DC input connected to a converter DC power bus, a single phase AC output connected to a converter AC power bus, and a plurality of converter switching devices connected between the converter DC power bus and the converter AC power bus for control of the single phase AC output, the power control system comprising:

a rectifier and peak voltage circuit having an input from the single phase AC output, a first output proportional to the instantaneous absolute value of an output voltage at the single phase AC output, and a second output proportional to the peak value of the rectified output voltage;

a current sensor for sensing the instantaneous magnitude of current on the converter AC power bus, the current sensor having an output proportional to the instantaneous magnitude of current on the converter AC power bus;

a unit sine function generator circuit having a first input from the first output of the rectifier and peak voltage circuit, a second input comprising the inverse of the second output of the rectifier and peak voltage circuits, and an output equal to the instantaneous value of the unit sine function;

a current limit circuit having an input control proportional to the instantaneous RMS current at the single phase AC output;

a feed forward current circuit having a first input from the output of the unit sine function generator circuit, a second input from the output of the current limit circuit, and an output equal to the control magnitude and wave shape of the instantaneous current supplied from the converter AC power bus to the single phase AC output;

a feed forward power circuit having a first input from the first output of the rectifier and peak voltage circuit, a second input from the output of the feed forward current circuit, and an output equal to the control magnitude and wave shape of the instantaneous power delivered from the converter from the single phase AC output;

a feedback power circuit having a first input from the first output of the rectifier and peak voltage circuit, a second input from the output of the current sensor, and an output proportional to the instantaneous power supplied from the converter AC power bus to the single phase AC output;

a power comparator circuit having a first input from the output of the feed forward power circuit, a second input from the output of the feedback power circuit, and an output equal to the difference between the first and second inputs of the power comparator circuit; and a switch controller having an input from the output of the power comparator circuit and an output proportional to the magnitude of the difference between the first and second inputs of the power comparator circuit, the output of the switch controller inputted to the plurality of converter switching devices to control the power output of the power converter.

7. The power control system of claim 6 wherein the switch controller comprises a PWM controller.

8. The power control system of claim 6 further comprising a fast average feed forward power comparator circuit having an input from the output of the feed forward power circuit and an output connected to the current limit circuit, the output of the fast average feed forward power comparator circuit equal to the difference between the fast average of the output of the feed forward power circuit and the output of a power reference circuit proportional to a control value of the maximum average power supplied from the single phase AC output.

9. The power control system of claim 8 wherein the fast average feed forward power comparator circuit comprises a cascaded pair of notch filters and a comparator, the input of the fast average feed forward power comparator circuit connected to the input of the cascaded pair of notch filters, the output of the cascaded pair of notch filters connected to a first input of the comparator, the output of the power reference circuit connected to a second input of the comparator, the output of the fast average feed forward power comparator circuit provided from the output of the comparator.

10. A method of controlling the power output of a converter having a DC input connected to a converter DC power bus and a single phase AC output connected to a converter AC power bus, the DC input comprising a DC link capacitive element connected to the DC output of an unstable DC source, the single phase AC output controlled by a plurality of converter switching devices connected between the converter DC power bus and the converter AC power bus, the method comprising the steps of:

generating a unipolar output voltage DC signal proportional to the instantaneous absolute value of an output voltage at the single phase AC output;

generating an output peak voltage DC signal proportional to the peak value of the rectified voltage of the output voltage;

generating a converter current signal proportional to the instantaneous magnitude of the AC current on the converter AC power bus;

generating a unit sine function value from the product of the unipolar output voltage DC signal and the inverse of the output peak voltage DC signal;

generating a feed forward current signal from the product of the unit sine function value and a limit current value;

generating a feed forward power signal from the product of the feed forward current signal and the unipolar output voltage DC signal;

generating a feedback power signal from the product of the unipolar output voltage DC signal and the converter current signal;

comparing the feed forward power signal to the feedback power signal to determine a difference power value equal to the difference between the value of the feed forward power signal and the value of the feedback power signal;

inputting the difference power value to a power conversion switch device controller; and outputting a control signal from the power conversion switch device controller to the plurality of converter switching devices, the control signal proportional to the difference power value.

11. The method of claim 10 wherein the power conversion switch device controller is a PWM controller and the control signal is a pulse width gating signal having a pulse width proportional to the difference power value.

12. The method of claim 10 wherein the limit current value is proportional to a control value of the maximum RMS current of an output current at the single phase AC output.

13. The method of claim 10 further comprising the steps of:
generating a fast average feed forward power signal;
comparing the value of the fast average feed forward power signal with the value of a power reference signal proportional to a control value of the maximum average power supplied to the single phase AC output to determine a difference fast power value equal to the difference between the value of the fast average feed forward power signal and the value of the power reference signal; and determining the limit current value from the sum of the difference fast power value and a control value of the maximum RMS current of an output current at the single phase AC output.

14. The method of claim 10 further comprising the step of selecting the unstable DC source from the group consisting of at least one photovoltaic cell, at least one wind turbine and at least one DC generator in a micro combined heat and power system.

15. A method of controlling the power output of a converter connected to an AC line load, the AC line load operating in at least an independently powered mode when the AC line load is powered solely from the power output of the converter, and optionally powered from one or more power sources independent of the power output of the converter in combination with the power output of the converter, the converter having a DC input connected to a converter DC power bus and a single phase AC output connected to a converter AC power bus, the single phase AC output controlled by a plurality of converter switching devices connected between the converter DC power bus and the converter AC power bus, the method comprising the steps of:

operating the converter in a stand-alone mode when the AC line load is powered solely from the output of the converter and in a grid-tied mode when the AC line load is optionally powered from one or more power sources in combination with the power output of the converter, wherein the step of operating the converter in the stand-alone mode comprises the steps of:

generating a stand-alone mode unipolar DC programmed output voltage control signal proportional to the instantaneous magnitude, frequency and phase of the stand-alone mode output voltage at the single phase AC output;

generating a stand-alone mode output peak voltage DC signal proportional to the stand-alone mode unipolar DC programmed output voltage;

generating a stand-alone mode unit sine function value from the product of the stand-alone mode unipolar DC programmed output voltage control signal and the inverse of the stand-alone mode output peak voltage DC signal;

generating a stand-alone mode feed forward current signal from the product of the stand-alone mode unit sine function value and a stand-alone mode limit current value;

generating a stand-alone mode converter current signal proportional to the instantaneous magnitude of the AC current on the converter AC power bus when operating in the stand-alone mode;

generating a stand-alone mode feed forward power signal from the product of the stand-alone mode feed forward current signal and the stand-alone mode unipolar DC programmed output voltage control signal;

generating a stand-alone mode unipolar output voltage DC signal proportional to the instantaneous absolute value of an output voltage at the single phase AC output when operating in the stand-alone mode;

generating a stand-alone mode feedback power signal from the product of the stand-alone mode unipolar output voltage DC signal and the converter current signal;

comparing the stand-alone mode feed forward power signal to the stand-alone mode feedback power signal to determine a stand-alone mode difference power value equal to the difference between the value of the stand-alone mode feed forward power signal and the value of the stand-alone mode feedback power signal;

inputting the stand-alone mode difference power value to a power conversion switch device controller; and outputting a stand-alone mode control signal from the power conversion switch device controller to the plurality of converter switching devices, the stand-alone mode control signal proportional to the stand-alone mode difference power value; and wherein the step of operating the converter in the grid-tied mode comprises the steps of:

generating a grid-tied mode unipolar output voltage DC signal proportional to the instantaneous absolute value of a grid-tied mode output voltage at the single phase AC output;

generating a grid-tied mode output peak voltage DC signal proportional to the peak value of the rectified voltage of the output voltage;

generating a grid-tied mode converter current signal proportional to the instantaneous magnitude of the AC current on the converter AC power bus;

generating a grid-tied mode unit sine function value from the product of the grid-tied mode unipolar output voltage DC signal and the inverse of the grid-tied mode output peak voltage DC signal;

generating a grid-tied mode feed forward current signal from the product of the grid-tied mode unit sine function value and a grid-tied mode limit current value;

generating a grid-tied mode feed forward power signal from the product of the grid-tied mode feed forward current signal and the grid-tied mode unipolar output voltage DC signal;

generating a grid-tied mode feedback power signal from the product of the grid-tied mode unipolar output voltage DC signal and the grid-tied mode converter current signal;

comparing the grid-tied mode feed forward power signal to the grid-tied mode feedback power signal to determine a grid-tied mode difference power value equal to the difference between the value of the grid-tied mode feed forward power signal and the value of the grid-tied mode feedback power signal;

inputting the grid-tied mode difference power value to the power conversion switch device controller; and outputting a grid-tied mode control signal from the power conversion switch device controller to the plurality of converter switching devices, the grid-tied mode control signal proportional to the grid-tied mode difference power value.

16. The method of claim 15 wherein the power conversion switch device controller is a PWM controller and the stand-alone mode and grid-tied mode control signals are a plurality of pulse width gating signals having pulse widths proportional to the stand-alone mode and grid-tied mode difference power values, respectively.

17. The method of claim 15 further comprising the steps of:

comparing the value of the stand-alone mode unipolar output voltage DC signal with the value of the stand-alone mode unipolar DC programmed output voltage control signal when operating in the stand-alone mode to determine a stand-alone mode difference output voltage equal to the difference between the value of the stand-alone mode unipolar output voltage DC signal and the value of the stand-alone mode unipolar DC programmed output voltage signal;

determining the stand-alone mode limit current value from a first limit current sum of the control value of the maximum RMS current of an output current at the single phase AC output and the stand-alone mode difference output voltage, and determining the grid-tied mode limit current value from the control value of the maximum RMS current of an output current at the single phase AC output.

18. The method of claim 17 further comprising the steps of:

generating a fast average feed forward power signal from the stand-alone mode feed forward power signal when operating in the stand-alone mode, and from the grid-tied mode feed forward power signal when operating in the gird-tied mode;

comparing the value of the fast average feed forward power signal with the value of a power reference signal proportional to a control value of the maximum average power supplied by the single phase AC output to determine a difference fast power value equal to the difference between the value of the fast average feed forward power signal and the value of the power reference signal; and wherein the stand-alone mode limit current value comprises a second limit current sum equal to the first limit current sum and the difference fast power value when operating in the stand-alone mode and the grid-tied mode limit current value comprises a third limit current sum equal to the sum of the control value of the maximum RMS current of an output current at the single phase AC output and the difference fast power value when operating in the grid-tied mode.

19. A power control system for a power converter, the power converter having a DC input connected to a converter DC power bus, a single phase AC output connected to a converter AC power bus, and a plurality of converter switching devices connected between the converter DC power bus and the converter AC power bus for control of the single phase AC output, the power control system comprising:

a rectifier circuit having an input from the single phase AC output and a rectifier output proportional to the instantaneous absolute value of an output voltage at the single phase AC output;

a current sensing circuit for sensing the instantaneous magnitude of current on the converter AC power bus to the single phase AC output, the current sensing circuit having an output proportional to the instantaneous magnitude of current on the converter AC power bus;

a stand-alone/grid-tied mode select switch having a stand-alone mode switch position and a grid-tied mode switch position, the stand-alone mode switch position connected to a programmed output voltage source, the grid-tied mode switch position connected to the rectifier output;

a peak voltage hold and detect circuit having an input connected to the stand-alone/grid-tied mode select switch so that when the stand-alone/grid-tied mode select switch is in the stand-alone mode switch position the input to the peak hold and detect circuit is connected to the programmed output voltage source, and when the stand-alone grid-tied mode select switch is in the grid-tied mode switch position the input is connected to the rectifier output;

a unit sine function generator circuit having a first and second unit sine function generator inputs and an output, the first unit sine function generator input connected to the stand-alone/grid-tied mode select switch so that when the stand-alone/grid-tied mode select switch is in the stand-alone mode switch position the first unit sine function generator input is connected to the programmed output voltage source, and when the stand-alone grid-tied mode select switch is in the grid-tied mode switch position the first unit sine function generator input is connected to the rectifier output, the second unit sine function generator input connected to the inverse output of the peak voltage hold and detect circuit, the unit sine function generator output equal to the instantaneous value of the unit sine function;

a difference output voltage comparator circuit having a first input from the output of the rectifier circuit, a second input from the stand-alone/grid-tied mode select switch, and an output equal to the difference between the first and second inputs of the difference output voltage comparator circuit so that when the stand-alone/grid-tied mode select switch is in the stand-alone mode switch position the first input to the difference output voltage comparator circuit is the programmed output voltage source and the output of the difference output voltage comparator circuit is difference between the output of the rectifier circuit and the programmed output voltage source;

a current limit circuit having a first input control proportional to a maximum RMS current delivered to AC output and a second input control from the output of the difference output voltage comparator circuit, the output of the current limit circuit equal to a first sum, the first sum equal to the value of the first input and second inputs to the current limit circuit;

a feed forward current circuit having a first input from the output of the unit sine function generator circuit, a second input from the output of the current limit circuit, and an output equal to the control magnitude and wave shape of the instantaneous current supplied from the converter AC power bus to the single phase AC output;

a feed forward power circuit having a first input from the stand-alone/grid-tied mode select switch, a second input from the output of the feed forward current circuit, and an output equal to the control magnitude and wave shape of the instantaneous power delivered from the converter from the single phase AC output;

a feedback power circuit having a first input from the output of the rectifier circuit, a second input from the output of the current sensing circuit, and an output proportional to the instantaneous power supplied from the converter AC power bus to the single phase AC output;

a power comparator circuit having a first input from the output of the feed forward power circuit, a second input from the output of the feedback power circuit, and an output equal to the difference between the first and second inputs of the power comparator circuit; and a switch controller having an input from the output of the power comparator circuit and an output proportional to the magnitude of the difference between the first and second inputs of the power comparator circuit, the output of the switch controller inputted to the plurality of converter switching devices to control the power output of the power converter.

20. The power control system of claim 19 further comprising a fast average feed forward power comparator circuit having an input from the output of the feed forward power circuit, the output of the fast average feed forward power comparator circuit equal to the difference between the fast average of the output of the feed forward power circuit and the output of a power reference circuit proportional to a control value of the maximum average power supplied from the single phase AC output, the output of the fast forward average feed forward power comparator circuit inputted to the current limit circuit and the output of the current limit circuit equal to the sum of the first sum and the output of the fast forward average feed forward power comparator circuit.

\* \* \* \* \*